J. LILPAKKA.
WEEDER.
APPLICATION FILED FEB. 23, 1915.
1,228,935.
Patented June 5, 1917.
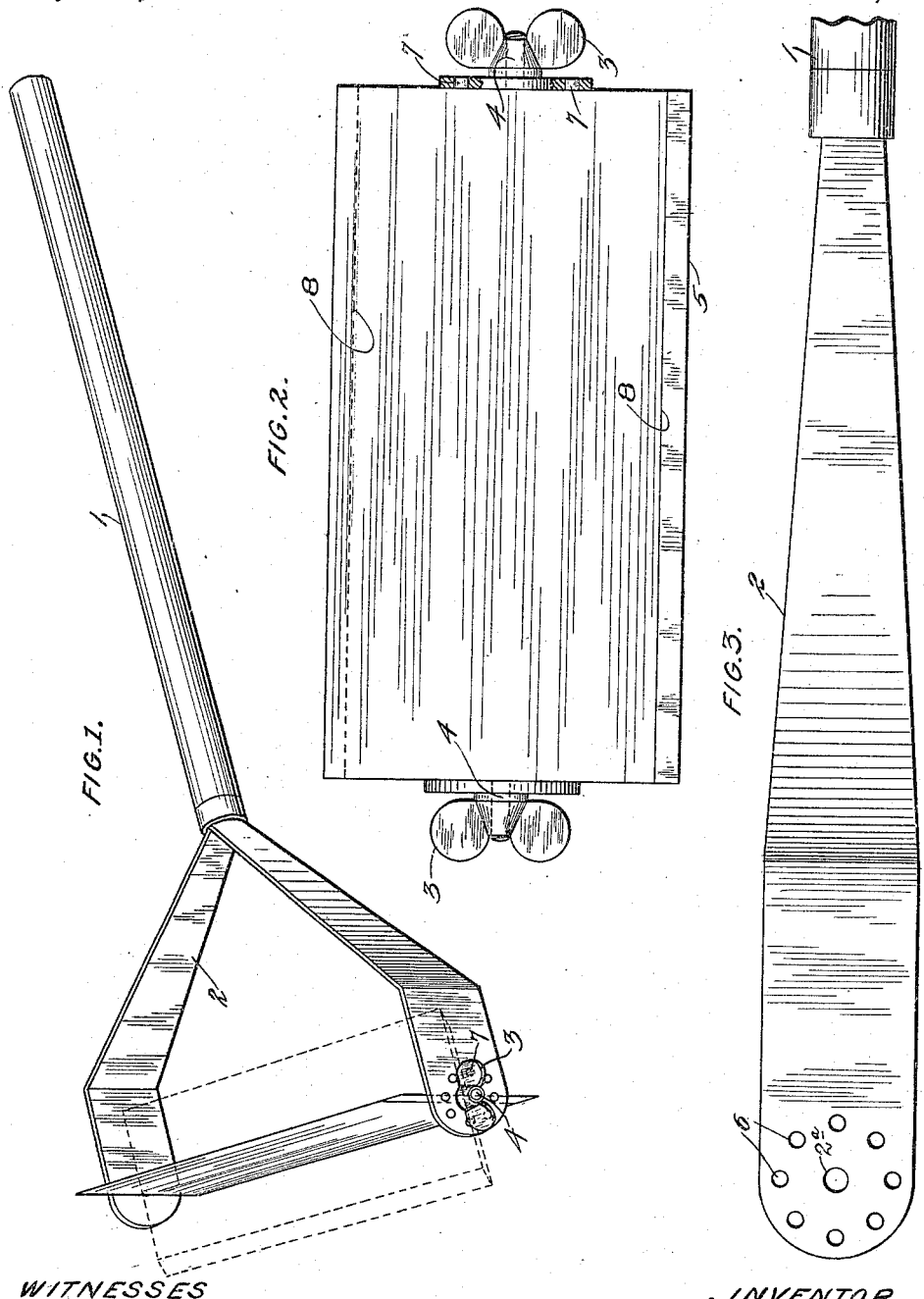

UNITED STATES PATENT OFFICE.

JAAKKO LILPAKKA, OF NEW CASTLE, PENNSYLVANIA.

WEEDER.

1,228,935.      Specification of Letters Patent.      Patented June 5, 1917.

Application filed February 23, 1915. Serial No. 10,039.

*To all whom it may concern:*

Be it known that I, JAAKKO LILPAKKA, a citizen of Finland, residing at New Castle, in the county of Lawrence and State of Pennsylvania, have invented certain new and useful Improvements in Weeders, of which the following is a specification.

This invention relates to improvements in garden tools and more particularly to a weeding implement comprising a flexible frame in which a cutting blade is adjustably supported and which blade may be set at any angle with the frame desired.

The invention consists in the combination and arrangement of parts to be hereinafter fully described in the following specification, pointed out in the claim and illustrated in the accompanying drawing which forms a part of said specification and in which—

Figure 1 is a perspective view of my improved weeding implement.

Fig. 2 is a front view of the same.

Fig. 3 is a side view of the frame and a portion of the handle.

Like reference characters indicate corresponding parts throughout the several views.

The reference numeral 1 designates the handle of the device to which the frame 2 is secured, the sides of which diverge from the handle and the free ends of which are apertured as at $2^a$ to receive the threaded pins 4, 4 carried by the blade 5. One free end of the frame is formed with a plurality of perforations 6 arranged in a circle through which the spurs 7, 7 carried by one end of the blade are adapted to project to retain the blade in adjusted position. The longitudinal edges of the blade 5 are preferably beveled as at 8, 8.

The blade is placed in position in the frame by manually forcing the free ends of the frame away from each other; the blade is now inserted in the frame and adjusted as desired and the pins 4 inserted in the apertures $2^a$ of the frame and the spurs 7, 7 in the adjacent perforations 6 of the frame. The wing nuts 3, 3 are now tightened upon the pins 4 and the tool is ready for use. The tool is pushed or pulled over the ground and the weeds encountered are cut by either beveled edge of the blade. The tool is one that may be manufactured at extreme low cost and that may be used by any one.

While the foregoing is the preferred embodiment of my invention it is understood that such changes may be made as do not go beyond the spirit or scope of my invention.

What is claimed is:—

A weeder comprising a handle, a spreadable frame secured to said handle and having its sides diverging therefrom in the plane of said handle and its free ends bent parallel with each other and apertured in alinement with each other, one of said frame ends being formed with a circle of perforations about its apertured portion as a center; a cutting blade extending transversely of said frame and provided upon its ends with pins received in the alined apertured portions of said frame ends to permit a rotary adjustment of the blade within its frame, and spurs carried by one end of said blade for releasable engagement with the perforations in the frame end.

In testimony that I claim the foregoing as my own I have hereto affixed my signature in the presence of two subscribing witnesses.

JAAKKO LILPAKKA.

Witnesses:
   KUSTA KASALA,
   KALLA KANGAS.

Copies of this patent may be obtained for five cents each, by addressing the "Commissioner of Patents, Washington, D. C."